United States Patent [19]

Lisec

[11] Patent Number: 4,616,746
[45] Date of Patent: Oct. 14, 1986

[54] APPARATUS FOR REMOVING STRIPS FROM COMPARTMENTS

[76] Inventor: Peter Lisec, Bahnhofstrasse 34, 3363 Amstetten-Hausmening, Austria

[21] Appl. No.: 635,437

[22] Filed: Jul. 27, 1984

[30] Foreign Application Priority Data

Sep. 5, 1983 [AT] Austria .................................. 3166/83

[51] Int. Cl.⁴ ...................... B65G 47/14; B65G 47/52
[52] U.S. Cl. .................................. 198/463.3; 198/680; 198/486.1; 414/418
[58] Field of Search ............... 198/444, 393, 443, 616, 198/484, 486, 592, 796, 463.3, 486.1, 680; 414/76, 82, 85, 43, 49, 390, 391, 398, 418

[56] References Cited

U.S. PATENT DOCUMENTS

| | | | |
|---|---|---|---|
| 2,828,788 | 4/1958 | Ashlock, Jr. | 198/443 |
| 3,022,905 | 2/1962 | Lyon | 198/444 |
| 3,311,216 | 3/1967 | Jones | 198/444 |
| 3,737,021 | 6/1973 | Reth et al. | 198/463.3 |
| 3,780,849 | 12/1973 | Hoehl et al. | 198/444 |
| 3,791,513 | 2/1974 | Barlow | 198/616 |
| 3,871,515 | 3/1975 | Randrup | 198/443 |
| 3,899,068 | 8/1975 | Wallace et al. | 198/444 |
| 4,090,618 | 5/1978 | Lehmann | 198/484 |

FOREIGN PATENT DOCUMENTS

| | | | |
|---|---|---|---|
| 363384 | 7/1981 | Austria . | |
| 511662 | 6/1952 | Belgium | 414/390 |
| 1268055 | 5/1968 | Fed. Rep. of Germany | 198/463.3 |
| 2480720 | 10/1981 | France | 414/43 |
| 30015 | 7/1964 | German Democratic Rep. | 198/463.3 |
| 34242 | 12/1964 | German Democratic Rep. . | |
| 1234059 | 6/1971 | United Kingdom | 198/444 |

Primary Examiner—Joseph E. Valenza
Assistant Examiner—Daniel R. Alexander
Attorney, Agent, or Firm—Young & Thompson

[57] ABSTRACT

An apparatus for removing strips (13) from compartments (2) wherein the strips (13) are disposed horizontally in hook-shaped brackets (3) comprises an inclined conveyor (7) movable into the region of a compartment (2) that is in the pickup position. A device (17) at the upper end of this inclined conveyor lifts the strips (13) off the conveyor, and an installation (23) removes the strips from the end of the device (17) on the delivery side.

10 Claims, 1 Drawing Figure

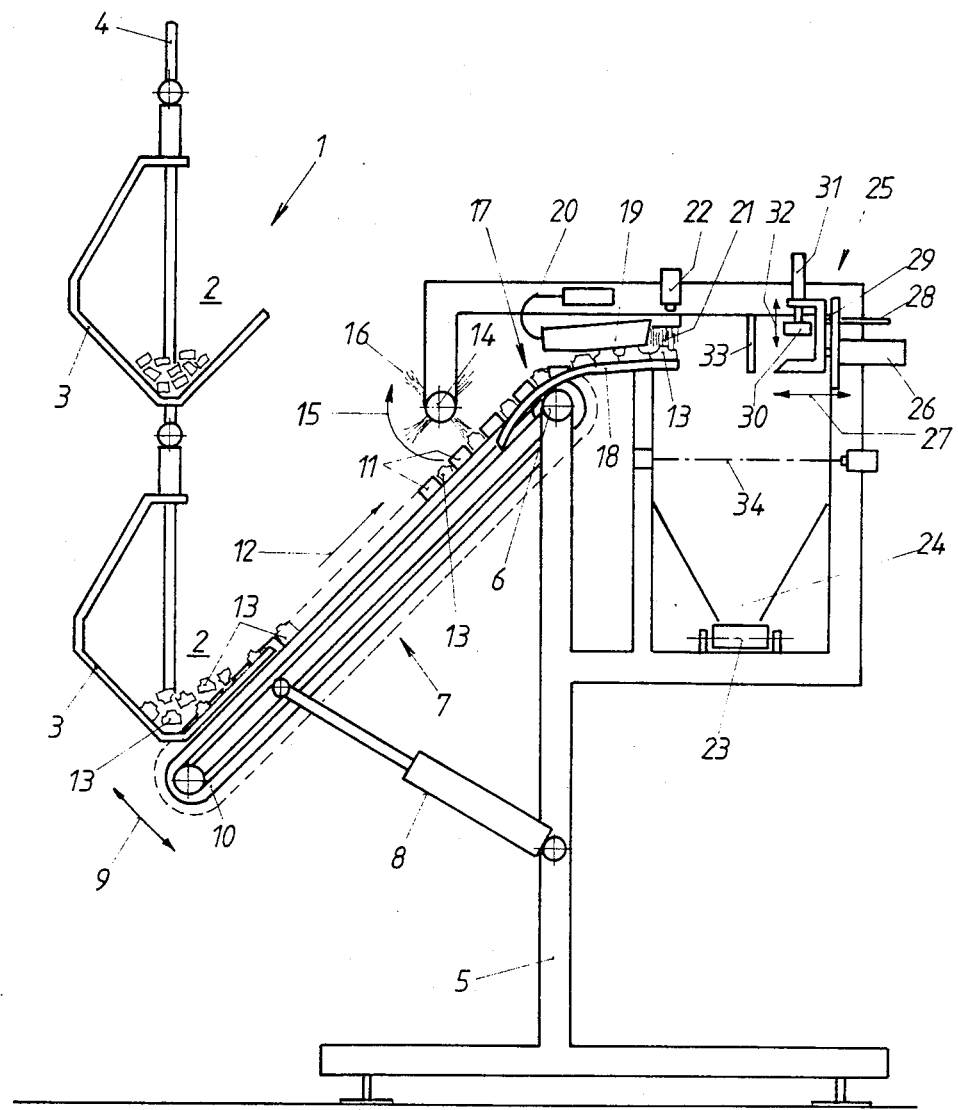

APPARATUS FOR REMOVING STRIPS FROM COMPARTMENTS

The invention relates to an apparatus for the removal of strips, especially of hollow profiled strips for spacer frames of insulating glass, from compartments wherein the strips are disposed horizontally in hook-shaped brackets, especially from compartments of a paternoster magazine.

The invention has the object of providing an apparatus of the above-described type making it possible to withdraw strips from the compartments and transport the same individually to a conveying element.

To achieve this object, the apparatus of the above-mentioned kind is characterized in that an inclined conveyor movable into a compartment present in the pickup position is provided. A device lifting the strips off the inclined conveyor is associated with the upper end of the inclined conveyor, the strips conveyed upwardly by the inclined conveyor and removed from the compartment being moved onto this device. An installation is included which takes the strips off the delivery end of the device lifting the strips off the inclined conveyor, and deposits them e.g. on a conveyor.

It is possible by means of the apparatus of this invention to remove strips from the compartment which is in the pickup position and feed the strips in succession to the final conveyor.

In a preferred embodiment, the installation removing the strips from the inclined conveyor is constituted by at least one gripper movable between a position wherein it seizes the strips at the delivery end of the device lifting the strips off the inclined conveyor, and a position wherein it deposits the strips onto the conveying element. It is preferred, in this connection, that at least two grippers be provided, each with one plunger, wherein the plungers can be advanced from above into contact with the strips; that a stop be arranged in the path of motion of the strips removed by the gripper; and that the stroke of the grippers extend to behind the stop.

According to a preferred embodiment of the invention, the inclined conveyor which, as seen in the longitudinal direction of the strips, is optionally subdivided into several sections, has at least one endlessly circulating conveyor member and carrier bars attached to the latter, wherein the carrier bars project into the interior of the compartment with the strips to be picked up. In an inclined conveyor of this construction, the strips to be removed drop in between the carrier bars and thus are securely transported to the removal point.

The removal of the strips from the inclined conveyor is possible without problems and without movable parts by equipping the device removing the strips with at least two curved rails; above each of these rails a pressure member is provided which is spring-loaded and urges the profiled strips against the rails. The strips lifted off the inclined conveyor are adequately retained by the pressure member so that they are available side-by-side for removal by a reciprocable gripper.

Additionally, at least one brush can be associated with the end of each of the curved rails on the delivery side.

In a further development of the apparatus of this invention, the upper end of the inclined conveyor can have a device acting to hold back any strips not arranged between the carrier bars, if desired returning these strips to the compartment. This prevents the transport of superposed strips to the point where the strips are lifted off the inclined conveyor. In this connection, the provision can be made of an optionally subdivided brush, revolving in opposition to the conveying direction of the inclined conveyor, the axis of which brush is essentially parallel to the strips transported on the inclined conveyor.

Furthermore, it is within the scope of the invention to make the inclined conveyor pivotable upwardly from below into the compartment from which the strips are to be removed, about an axis extending parallel to its upper end. It is possible in this way to pivot the inclined conveyor away while the compartments are being moved, and to move the conveyor into the compartments for pickup purposes. The stroke of the removing conveyor toward the compartments can be limited by means of a stop for the inclined conveyor, this stop abutting against the brackets forming the compartments.

Furthermore, the provision can be made within the invention to locate the transporting member, for example a conveyor belt, on the bottom of a longitudinally extending, V-shaped trough and/or to make the conveyor the bottom of the trough.

Preferably, the carrier bars of the inclined conveyor are in the form of angled bars.

Provision can also be made to include a detecting device, especially a light barrier, which detects the presence of a strip at the delivery end of the rails. This device makes it possible to extensively automate the apparatus of this invention and to arrest the inclined conveyor once a strip is ready to be removed by the gripper. For this purpose, the detecting device stops the inclined conveyor when a strip is present, and triggers the pickup stroke of the gripper.

According to the invention, a light barrier can be arranged underneath the gripper in order to determine whether a strip seized by the gripper has been duly deposited by the latter on the transporting member.

Additional details and features of the invention can be seen from the following description with reference to the drawing representing a schematic lateral view of an apparatus embodying the invention.

In the illustrated embodiment, the apparatus of this invention serves for the removal of strips from a paternoster magazine 1 with compartments 2 constituted by hook-like brackets 3, which latter are suspended in a pendulant fashion from endless circulating chains 4, only partially illustrated.

The apparatus for the removal of strips from a compartment 2 of the paternoster magazine 1 comprises an inclined conveyor 7 supported on a stand 5 to be pivotable about a horizontal axis 6. The inclined conveyor 7 can be swung upwardly with the aid of a pressure medium cylinder 8 about the axis 6 from the bottom in the direction of the double arrow 9 into its position wherein it is correlated with the compartment 2 in the pickup position.

The inclined conveyor 7 includes at least two endless circulating chains, belts, or the like 10, to which are attached spaced-apart carrier bars 11 which can be fashioned as angled bars. The bars 11 extend essentially in parallel to the longitudinal extent of the compartments 2 of the paternoster magazine 1. In the operative position of the inclined conveyor 7, the carrier bars 11 project into the interior of the compartment 2 which is in the pickup position, so that upon movement of the chain 10 in the direction of arrow 12, strips 13 can be removed from the compartment 2 and conveyed upwardly.

A device for holding back any strips 13 not disposed in between carrier bars 11 is arranged in the upper section of the inclined conveyor 7 so that only strips 13 lying between the carrier bars 11 pass to the upper end of the inclined conveyor 7. In the illustrated embodiment, this device is fashioned as a brush 16 rotatable in the direction of arrow 15 which is rotatably supported about an axis 14 on the stand 5. Several brushes 16 in side-by-side relationship can be provided in place of a continuous brush 16.

A device 17 is arranged at the upper end of the inclined conveyor 7, by means of which the strips 13 are lifted out of the spaces between the carrier bars 11 of the inclined conveyor 7. In the illustrated embodiment, the device 17 comprises at least two curved rails 18 lifting the profiled strips 13 out of the spaces between the carrier bars 11 of the inclined conveyor 7. A pressure member 19 is disposed above the free end of the curved rails 18, which end extends substantially horizontally. The pressure member is mounted on the stand 5 by a spring 20 and pressures against the strips 13 lying on the rails 18. It is understood that a pressure member 19 can be provided for each rail 18. A brush 21 is likewise associated with the substantially horizontal section of the rails 18. The pressure member 19 and the brush 21 impede the advance of the profiled strips 13 on the rails 18 so that they are pushed in closely juxtaposed relationship toward the free end of the rails 18.

At least one light barrier 22 is arranged above the free end of the rails 18, detecting the presence of a strip 13 lying on the outermost ends of the rails 18. As soon as the light barrier 22 has detected a strip 13, the inclined conveyor 7 is automatically caused to be arrested by that detection.

Underneath the free end of rails 18, transporting means 23, constructed as a belt conveyor, for example, is arranged to carry away individual strips 13. A longitudinally extending, approximately V-shaped trough 24 is located above the belt conveyor 23, the bottom of this trough being constituted by the belt conveyor 23. The trough 24 ensures that strips 13 are reliably deposited on the belt conveyor 23.

A gripper 25 is furthermore provided on the stand 5, this gripper being displaceable to and fro in the direction of arrow 27 by means of a pressure medium cylinder 26. For the guidance of the gripper 25, a guide rod 28 is provided, connected to the gripper 25 and guided, just as the gripper 25, in a bearing plate 29 affixed to the stand. The gripper 25 also comprises a plunger 30 which can be moved up and down by a pressure medium cylinder 31 in the direction of double arrow 32. In order to take off the strip 13 lying at the delivery end of the rails 18 and retained thereon by the brush 21, the gripper 25 is advanced toward the rail 18, the plunger 30 is actuated, and then the gripper 25 is moved back. During the return stroke, the gripper 25 entrains the strip 13 which latter, with the return stroke being continued, is pulled out of the gripper 25, contacts a stop 33 affixed to the stand which strips it from gripper 25, and drops onto the conveyor belt 23 at the bottom of trough 24.

Another light barrier 34, or preferably two light barriers 34, are provided beneath the path of movement of the gripper 25 in the region of the two ends of the strip 13, monitoring the correct dropping of the strip 13 from the gripper 25 onto the conveyor belt 23. Only after the light barrier 34 has determined the correct dropping of a strip onto the conveyor belt 23 will the gripper 25 be released for grasping the next strip 13. In the meantime, the light barrier 22 has determined that there is no strip 13 present on the delivery end of the rails 18 and has reactivated the inclined conveyor 7 so that strips 13 are advanced on the rails 18 until again a strip is located at the free end of the rails 18 and is detected by the light barrier 22.

In the case of relatively long strips 13 disposed in the compartments, the compartments 2 are formed by several hook-like brackets 3; in this instance, several inclined conveyors 7 can be provided which are arranged side-by-side and can be operated and pivoted upwardly at the same time. However, an embodiment wherein only two inclined conveyors 7, operating in the end zones of the strips to be removed, are provided is likewise possible.

Ordinarily, two grippers 25 will be provided, as two will be sufficient for removing the strip 13, ready for pickup, from the rails 18. But a larger number of simultaneously operated grippers 25 can also be provided.

In the case of relatively short strips 13, two curved rails 18 are adequate. However, especially in the case of hollow profiled strips, such as hollow profiled strips for spacer frames of insulating glass panes, it is recommended to provide several rails 18 distributed over the length of the strips.

What is claimed is:

1. Apparatus for the removal of strips from a compartment wherein the strips are disposed horizontally, comprising an inclined conveyor (7) having an upper end and a lower end, said lower end being disposed in the vicinity of said compartment (2) to engage strips (13) in the compartment and raise the strips to said upper end, means (18) at said upper end of the conveyor for lifting strips off the conveyor and for forming an advancing series of strips (13), a further conveyor (23), and means (25) for removing strips from said lifting means and for depositing said removed strips on said further conveyor, said removing means (25) comprising gripper means that grasp the most advanced strip of said series of strips (13) on said lifting means (18) and move said most advanced strip transverse to the length of said strips off said lifting means, and a stop (33) arranged in the path of movement of the strips to contact said most advanced strip and remove said most advanced strips from said gripper means after which said most advanced strip falls onto said further conveyor (25), said lifting means (18) comprising a plurality of curved rails that receive said strips (13) transverse to the length of the rails, and a pressure member (19) spring urged toward the upper surface of each of said curved rails, the strips forcing each other into said series between said curved rails and said pressure member.

2. Apparatus according to claim 1, and means (8) for swinging said inclined conveyor (7) vertically about said upper end thereof to move said lower end of said inclined conveyor toward and away from a said compartment (2).

3. Apparatus according to claim 1, in which said inclined conveyor (7) comprises an endless conveyor (10) having transverse carrier bars (11) that are spaced apart to receive between them said strips (13).

4. Apparatus according to claim 1, and a brush (21) at the discharge end of said pressure member (19) to retain said strips (13) on said curved rails (18) until said removing means (25) remove said most advanced strip from said curved rails.

5. Apparatus according to claim 3, and means (16) for holding back strips (13) on said inclined conveyor (7) that are not disposed between said bars (11).

6. Apparatus according to claim 5, said holding back means (16) comprising a brush which rotates adjacent the carrier bars in a direction (15) opposite the direction of movement of the carrier bars (11) about a horizontal axis (14) parallel to the length of the strips (13).

7. Apparatus according to claim 1, said further conveyor (23) comprising a conveyor belt that extends lengthwise in a direction parallel to the length of said strips, and a V-shaped trough (24) above the conveyor belt for directing said strips onto the conveyor belt.

8. Apparatus according to claim 1, and a light barrier (22) which detects the presence of said most advanced strip (13) at the delivery end of said rails to arrest said inclined conveyor (7).

9. Apparatus according to claim 8, in which said light barrier (22) actuates said inclined conveyor (7) in the absence of a strip at said delivery end of said rails.

10. Apparatus according to claim 1, and a light barrier (34) for detecting the passage of a said strip (13) from said removing means (25) to said further conveyor (23), said light barrier (34) disabling said removing means (25) in the absence of the passage of a said strip (13).

* * * * *